G. W. COGGESHALL.
METHOD OF PREPARING MATERIALS FOR FURNACING.
APPLICATION FILED DEC. 17, 1910.
987,554.
Patented Mar. 21, 1911.
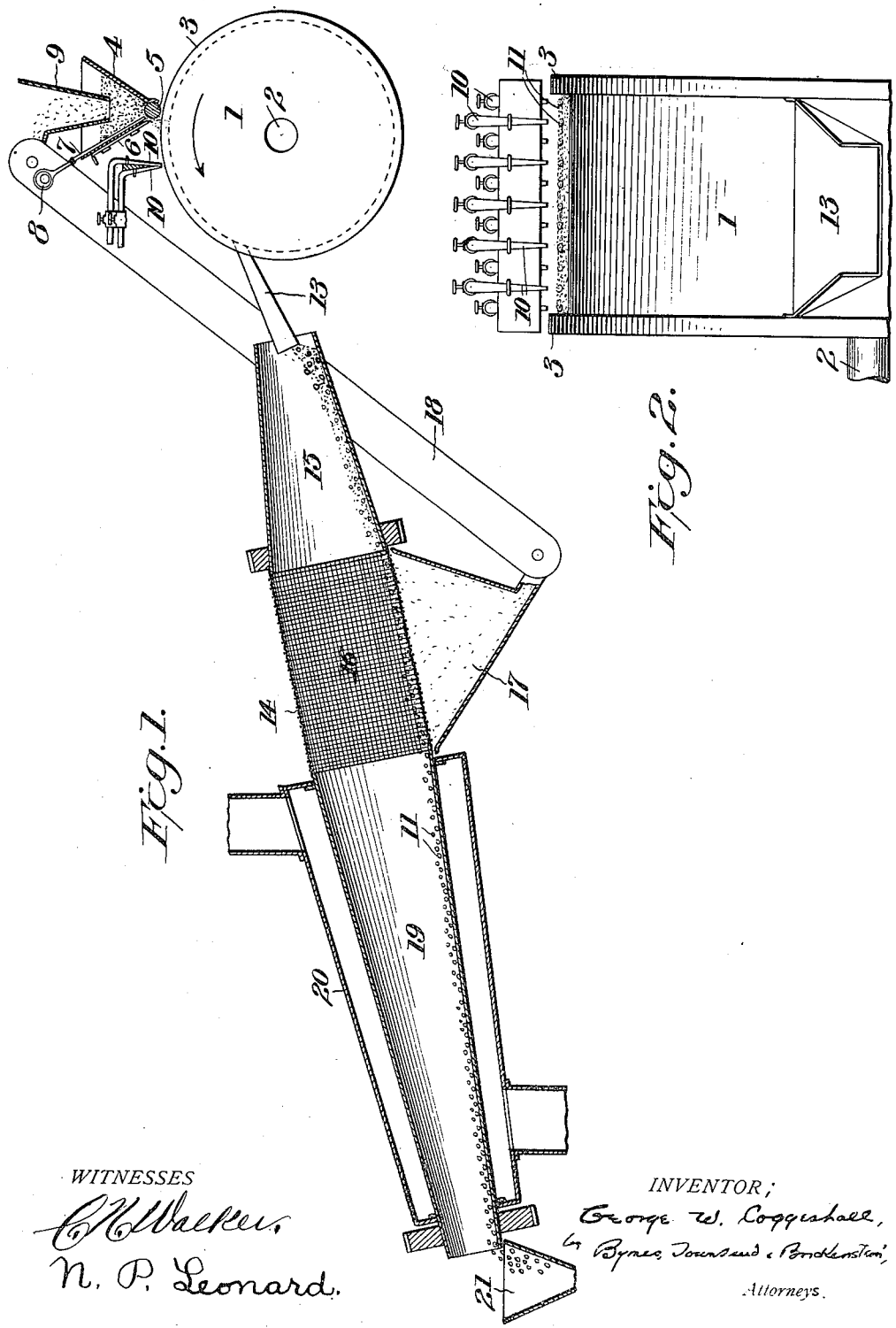
WITNESSES
INVENTOR;
George W. Coggeshall,
Attorneys.

UNITED STATES PATENT OFFICE.

GEORGE W. COGGESHALL, OF DEDHAM, MASSACHUSETTS.

METHOD OF PREPARING MATERIALS FOR FURNACING.

987,554.   Specification of Letters Patent.   Patented Mar. 21, 1911.

Application filed December 17, 1910. Serial No. 597,819.

*To all whom it may concern:*

Be it known that I, GEORGE W. COGGESHALL, a citizen of the United States, residing at Dedham, in the county of Norfolk and State of Massachusetts, have invented certain new and useful Improvements in Methods of Preparing Materials for Furnacing, of which the following is a specification.

This invention relates to methods of preparing charges for furnacing, a primary object of the invention being the provision of a method applicable to the treatment of pulverulent bodies or mixtures to convert them into aggregates suitable for furnacing. The invention further relates to methods of furnacing such aggregates.

The invention is applicable to the treatment of pulverulent charges in general, including such as do not possess sufficient colloidal or plastic or self-binding properties to yield solid lumps or aggregates when wet with water and then dried.

It is well known that it is usually difficult to secure completeness of reaction between the components of pulverulent mixtures. If such mixtures are heated in a quiescent state to temperatures short of actual fusion, the reaction may occur to an extent which is limited by the imperfect contact of the solid particles comprising the mixture. If the mixtures are stirred or agitated or heated in a rotary furnace the reaction is likewise usually incomplete, owing not only to the imperfection of the contact between the particles, but to the concentrating effect of such stirring operations, whereby a certain segregation of the components occurs, leading to irregularities in the composition of the mixture. If on the other hand the thoroughly mixed particles are united into lumps, briquets or aggregates which are sufficiently hard and strong to withstand furnacing, a much more nearly complete reaction may be secured under similar heating conditions.

According to the present invention a pulverulent material or mixture, comprising some or all of the bodies which are to react under furnace conditions, is acted upon by water or by other appropriate liquid binding agent, under such conditions as to give rise to lumps or aggregates of the mixture associated with an excess of the unchanged powder. Thereafter such aggregates, preferably after being separated from the pulverulent mass, are subjected to a suitable furnacing process, preferably in a rotary kiln or furnace.

For a full understanding of my invention reference is made to the accompanying drawing wherein:

Figure 1 is a diagrammatic view of one form of apparatus for the preparation of aggregates, parts being shown in longitudinal section; and Fig. 2 is a view showing the drum and liquid-supplying means in elevation.

In said drawings 1 represents a drum which may be of iron suitably mounted for slow rotation on a shaft 2, and provided with lateral flanges 3, 3. Above the drum is a hopper 4 shown as provided with a discharge roller 5 and an adjustable discharge gate 6.

7 is a reciprocating plate operated by an eccentric 8 and serving to insure a positive and regular feed.

9 is an upper hopper from which the powdered material is fed directly into the hopper 4.

The mechanism is adjusted to feed to the upper surface of the slowly moving drum a bed or layer of powdered material to a depth of one-half inch, more or less.

Near the hopper and above the layer of material on the drum 1 is disposed a transverse series of valved dropping tubes 10. From these tubes the water or other binding liquid is discharged, preferably in separate drops falling at such intervals, relative to the speed of the drum, as to give rise to detached clumps or aggregates 11 which at the moment of their formation lie upon and in a bed of unchanged powder 12. These aggregates are removed from the drum, together with the unchanged powder, by a scraper 13 and are discharged into a revoluble separating and drying tube 14, having a perforated or screen section 16. In this section the unchanged powder is separated from the aggregates, falling into a hopper 17 whence it is continuously returned by any suitable conveyer 18 to the hopper 9. The aggregates 11 roll down through the lower section 19 of the tube, and may be further dried and hardened therein. For this purpose the section 19 may be surrounded by a fixed casing 20 through which the waste gases from the furnace may circulate. The dried aggregates are discharged into a hopper 21 from which they may pass directly to a rotary furnace of the type used for example for burning cement. In the form of tube illustrated there is provided also a section 15 disposed between the drum and the screen section 16; in this section the aggregates and the unchanged powder are agitated together, in order to insure the fullest possible utilization of the liquid binding agent.

The character of the binding agent will of course depend upon the physical and chemical nature of the mixture to be furnaced. For pulverulent mixtures which possess sufficient colloidal character to form lumps when wet with water and then dried, as for example mixtures of clay and limestone for the preparation of hydraulic cement or the like, water alone may be used. In case of mixtures which do not become self-binding when treated with water, I may apply liquid binding agents such for example as molasses, sugar solutions, waste sulfite liquor or pulp mill liquor, solutions of glue or the like; or tarry or bituminous binders may be used, dissolved in appropriate solvents or liquefied by heat. When the charge is not of itself capable of forming aggregates with water, it may be rendered so by suitable additions of dry materials, as clay or lime, having colloidal or self-binding properties, or by the addition of solid binding agents, water or an appropriate liquid being distributed over the mass as above described; or some substance or substances may be added which will have a cementing effect as the result of chemical action with one or more of the materials composing the dry mixture; for example, in cases where one of the reagents is a salt which may take up water of crystallization, as for example potassium or sodium carbonate, satisfactory aggregates may be formed by providing a pulverulent mixture containing this salt in an anhydrous or partially anhydrous state; if water be then distributed upon the mixture it is found that the production of hydrated crystals of the salt is accompanied by the formation of aggregates well adapted for the purposes of this invention.

The aggregates produced by the distribution over the surface of a pulverulent mixture, of separate drops of water are rounded masses, often somwhat irregular in shape, and of comparatively small size, say from one-eighth to three-eighths inch in diameter. In most cases they are sufficiently strong to withstand screening before being dried, although if necessary the mixture of powder and aggregates may be dried or heated before screening, as for example by applying steam heat to the interior of the drum 1 or to the exterior of tube section 15. After screening and drying the aggregates should be sufficiently hard to withstand furnacing under such conditions as may be applicable for the particular case, without being crushed to powder, although they may in some cases break down into smaller aggregates, lumps or particles.

It is characteristic of the present invention that the aggregates are prepared without the use of external formative agencies, by which is meant means for subjecting the material to external pressure, for balling by rotation, or similar devices.

It is an important advantage of my invention that inasmuch as the aggregates are formed from and in presence of an excess of the powdered charge, the water or other liquid is in all cases utilized to the fullest possible extent, avoiding the formation of pasty masses or sludges which present mechanical difficulties in handling. It is a further important feature of this invention that the aggregates are formed without the expense and difficulty attending the application of external pressure.

An illustrative specific embodiment of the invention is as follows: For the preparation of potassium titanate, rutile or other form of titanium oxid is ground to 200 mesh or finer and thoroughly mixed with commercial anhydrous potassium carbonate, the titanium oxid and potassium carbonate being in substantially molecular proportions. Water is distributed over the pulverulent mass, resulting in the formation of aggregates which are separated by screening from the excess of unchanged powder. The aggregates are then heated in a rotary furnace, and it is found that at a dull red heat the reaction is almost quantitative in as short a time as seventeen minutes. Potassium titanate is formed in accordance with the equation

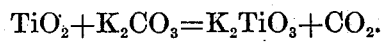
$$TiO_2 + K_2CO_3 = K_2TiO_3 + CO_2.$$

Instead of supplying water or other binding liquid in the form of separate drops, it may be supplied as fine streams or the like, resulting in the production of elongated or more or less extended aggregates or crusts, which may be treated as above described, being broken up to a greater or less extent in their transit through the apparatus, but never breaking down to their ultimate particles.

I claim:—

1. The method of preparing aggregates suitable for furnacing without the use of external formative agencies, which consists in distributing a liquid binding agent upon a pulverulent mass, under such conditions that a portion only of the mass is converted into separate aggregates.

2. The method of preparing pulverulent material for furnacing without the use of external formative agencies, which consists in aggregating portions of a pulverulent charge by distributing thereon a liquid binding agent, and separating the aggregates from the residual pulverulent material.

3. The method of preparing pulverulent material for furnacing without the use of external formative agencies, which consists in aggregating portions of a puverulent charge while in transit by distributing thereon a liquid binding agent, conveying the aggregates upon or in a bed of residual pulverulent material, and separating the aggregates from such pulverulent material.

4. The method of preparing an alkali metal titanate, which consists in preparing a pulverulent mixture of an oxidized titanium compound and an alkili metal carbonate containing less than the full proportion of water of crystallization, aggregating said mixture by adding water thereto, and furnacing the aggregates.

In testimony whereof, I affix my signature in presence of two witnesses.

GEORGE W. COGGESHALL.

Witnesses:
   ALLERTON S. CUSHMAN,
   CLINTON P. TOWNSEND.